United States Patent [19]

Watson et al.

[11] Patent Number: 5,475,839
[45] Date of Patent: Dec. 12, 1995

[54] METHOD AND STRUCTURE FOR SECURING ACCESS TO A COMPUTER SYSTEM

[75] Inventors: Bruce W. Watson, Norcross; R. Jeff Lee, Lawrenceville, both of Ga.

[73] Assignee: National Semiconductor Corporation, Santa Clara, Calif.

[21] Appl. No.: 341,302

[22] Filed: Nov. 16, 1994

Related U.S. Application Data

[60] Continuation of Ser. No. 198,530, Feb. 18, 1994, abandoned, which is a division of Ser. No. 70,504, Jun. 2, 1993, abandoned, which is a continuation of Ser. No. 500,755, Mar. 28, 1990, abandoned.

[51] Int. Cl.⁶ .................................................. G06F 12/14
[52] U.S. Cl. ........................................ 395/650; 380/4
[58] Field of Search .................................. 395/650, 700, 395/425, 325, 575; 380/4; 235/380

[56] References Cited

U.S. PATENT DOCUMENTS

| | | | |
|---|---|---|---|
| 3,890,601 | 6/1975 | Pietrolewicz | 340/172.5 |
| 4,609,777 | 9/1986 | Cargile | 178/22.08 |
| 4,677,284 | 6/1987 | Genest | 235/487 |
| 4,734,856 | 3/1988 | Davis | 364/300 |
| 4,785,361 | 11/1988 | Brotby | 360/60 |
| 4,786,900 | 11/1988 | Karasawa et al. | 340/825.31 |
| 4,816,654 | 3/1989 | Anderi | 235/380 |
| 4,866,769 | 9/1989 | Karp | 380/4 |
| 4,879,645 | 11/1989 | Tamada et al. | 235/380 |
| 4,937,864 | 6/1990 | Caseiras et al. | 380/4 |
| 4,951,249 | 8/1990 | McClung et al. | 395/425 |
| 5,018,096 | 5/1991 | Aoyama | 395/575 |
| 5,022,077 | 6/1991 | Bealkowski | 380/4 |
| 5,113,499 | 5/1992 | Ankney et al. | 395/325 |
| 5,121,345 | 6/1992 | Lentz | 364/550 |
| 5,144,659 | 2/1993 | Jones | 380/4 |
| 5,191,611 | 3/1993 | Lang | 380/25 |
| 5,206,905 | 4/1993 | Lee et al. | 395/425 |

FOREIGN PATENT DOCUMENTS 90623640  5/1990  WIPO ............................. H04L 9/00

OTHER PUBLICATIONS

"Security", Wayne Rash, Jr., BYTE, Jun. 1989, p. 254.
"How Safe Is It?", Martin Kochanski, BYTE, Jun. 1989, p. 257.
"Secret Codes" Asael Dror, BYTE, Jun. 1989, p. 267.
Know Thy Viral Enemy, BYTE, Jun. 1989, p. 275.
Personal and Private, Peter Stephenson, BYTE, Jun. 1989, p. 285.
The Safety Zone, BYTE, Jun. 1989, p. 290.

(List continued on next page.)

*Primary Examiner*—Thomas G. Black
*Assistant Examiner*—Peter Y. Wang
*Attorney, Agent, or Firm*—Steven F. Caserza; Flehr Hohbach Test Albritton & Herbert

[57] ABSTRACT

Tests are performed prior to or during the boot operation to determine whether files are corrupted. This may indicate the presence of a virus. If a potential error is detected, boot is halted, allowing the user to boot from uncorrupted files. In another embodiment, an uniquely formatted floppy diskette is used as an access diskette serves as a hardware key to gain access. In another embodiment, a host controls information stored locally. In another embodiment, security from unauthorized access is provided once a valid user has legitimately accessed a computer. In response to a predefined hot key or a predetermined period of time during which the user has not provided input, portions of the computer are disabled. Upon entry of access information by the valid user, the disabled features are enabled. In another embodiment, access to the computer is made more difficult in response to invalid access attempts. In one embodiment, once a threshold number of invalid access attempts is reached, the computer is locked up, requiring reboot, thereby increasing the difficulty of a would be intruder to gain access to the computer. In one embodiment, once the threshold value is reached, it is reset to a lower value.

8 Claims, 4 Drawing Sheets

OTHER PUBLICATIONS

Memorized Passwords, Robert J. Bosen, Multi–User, Nov. 1985, pp. 28–42.
Security–Microcomputer Encryption and Access Control Products, PC Communications Dec. 1986, pp. 15–17.
Advisory Memorandum on Office Automation Security Guideline, NTISSAM COMPUSEC/1–87 Jan. 16, 1987.
NSCS–TG–005, Library No. S228,526, Version 1, "Trusted Network Interpretation"
NSCS–TG–004–88, Library No. S–231,238, "Glossary of Computer Security Terms".
Recovering from a Computer Virus Attach, F. Davis et al., The Journal of Systems and Software 7, pp. 253–258 (1987).
IBM Tech. Disc. Bull., vol. 32, No. 3A, "Hardware Monitor Security Feature" pp. 284–285, Aug. 1989.
IBM Tech. Disc. Bull., vol. 31, No. 9, "Discouraging Penetration Attempts on Interactive Computer Systems without Denial–of–Service" pp. 147–149, Feb. 1989.

METHOD AND STRUCTURE FOR SECURING ACCESS TO A COMPUTER SYSTEM

CROSS REFERENCE TO RELATED APPLICATIONS

This application is a Continuation of U.S. application Ser. No. 08/198,530, now abandoned, filed Feb. 18, 1994, which is a divisional of U.S. Ser. No. 08/070,504, now abandoned, filed Jun. 2, 1993, which in turn is a continuation of U.S. Ser. No. 07/500,755, now abandoned, filed Mar. 28, 1990.

TECHNICAL FIELD

This invention pertains to electronic computers, and more specifically to security systems for use with electronic systems. The teachings of this invention are particularly useful for providing security in computer networks having more than one computer, for example a computer network including a plurality of PCs and a larger computer, such as a mainframe, serving as a host.

BACKGROUND

The overall computer security strategy of a computer network is only as strong as its weakest link, and unsecured PCs connected to mainframes represent an extremely weak link. For instance, authorized PC users can legitimately download large amounts of mainframe information. This data, which had been protected by the mainframe's access control facilities, is then easily accessed by anyone who can turn on the PC. Unauthorized users can copy sensitive data, modify data that will be uploaded to the mainframe, or destroy valuable information. Even worse, some users utilize "macro key generators" to automate host logons. Thus anyone who can access the PC can access the mainframe.

Most professionals keep sensitive, confidential, or critical documents (such as personnel files, financial information, marketing and sales information, and confidential memos) securely locked up in file cabinets. Yet many of these same professionals have not put access controls onto their PCs that contain equally valuable and sensitive information. A major reason is that prior art PC security products tend to be obtrusive, complicating implementation and daily use, and often degrade system performance. Such controls are quickly discarded as being impractical.

A major accounting firm recently reported that over 50% of American managers have suffered computer-related losses including data destruction, confidentiality breaches, and misuse of information. Unauthorized employee access was cited as the leading cause. After all, unprotected PC files can be accessed by even novice PC users. Disgruntled employees, cleaning crews, etc. can copy, modify, or destroy sensitive, valuable, and often irreplaceable data.

As PCs have proliferated through business, so has the importance of the information they manage, and the risk of information misuse and loss. As more company-critical applications and data are used on PCs, the issues of security go beyond the personal inconvenience of having data lost, destroyed, or stolen. The loss of any data, including word processing documents, spreadsheets, databases, etc., can be traumatic, and the mishap is not to be taken lightly. In company critical applications, the loss of even several hours could mean the loss of thousands of dollars, due to lost business opportunities, a lost order, or customer goodwill, in addition to problems created by the inability to process important monthly or payroll type applications.

Large companies with MIS departments are very security conscious, with formal security procedures, plus software and data safeguards. The data on the PC can be just as critical to the individual or company, as the data contained on a mainframe. The fact that it is stored on a PC doesn't make the data less valuable of the need for security any less.

What is the value of your PC data? As the PC has become much more than an expensive calculator, many people and businesses view the PC and PC based data to be critical to the functioning of their business. When you take into consideration the hours, days, or weeks spent in creating and modifying PC based data in most cases the value of the data stored on the PC is many times greater than the value of the hardware. Although the risks of misuse of data and of PC virus attack are small, they are growing. It is good business practice to protect your data, if the cost is reasonable, if it is not difficult, or time consuming. This is no different than protecting old style "files" in locked fire proof cabinets. The technology is different, but the issues are the same.

By restricting access via passwords, this vulnerability is reduced. Many approaches to this problem have been implemented in software. Unfortunately, this type of implementation can often be defeated by simply inserting a DOS boot disk into drive A. To be effective, the solution to this problem requires a hardware component which restricts any access to the machine without a valid password. Because such hardware solutions intercept control before the disk operating system starts, this form of protection cannot be defeated by booting from a floppy disk. Unfortunately, such prior art hardware based protection schemes requires specialized hardware which will serve as the hardware access key, as well as often times requiring specialized hardware within the computer itself to interrogate the hardware key.

Conventional access control packages for small computers utilize passwords only. Any person gaining knowledge of the password can access the system. Alternative access control mechanisms provided by other packages require special hardware and/or special key devices. Other implementations create diskettes that are not unique from system to system, or from creation to creation.

The conventional approach to security functions is to integrate them into the application which uses them. This increases the size of the application. Furthermore, no standard mechanism exists for a group of applications to alter the security configuration of the system. Many access control systems provide an unlimited number of illegal attempts.

Although password access control exists on a host system, which is administered by the host, no mechanism currently exists for a host system to remotely control access to a personal computer.

There are a number of other prior art approaches to PC security. They span the gamut from biometric thumb scan access, to special sealed Tempest shielded PCs to prevent electronic snooping, to DES encryption of all files with specific access passwords on a file or directory level. While such severe measures are certainly warranted in the use and handling of highly sensitive or classified data, this level of security is not generally required or needed in the business environment.

Another threat to the data and programs stored on a PC is attack from a computer virus. These small programs can attach themselves to a normal program or data file, which may be inadvertently copied from system to system. Once a virus program has been copied to a PC, it can cause serious damage to program and data files that reside on the system.

Without some form of protection, the PC user may not realize that the system has been infected until after damage has been done.

There are a number of prior art approaches to virus protection. They include never using a disk from anyone, never downloading data from a bulletin board service (BBS) or via a modem, not connecting to a network, checking each program or file with a virus finder, only running new programs on a floppy or on a quarantine machine until determined safe, having a special program slow down the processing of the PC while it watches every activity to determine if is normal or a virus. While these measures can add additional levels of protection, practicality in a business environment must be considered.

Some prior art approaches to virus protection check hard disk system ares and files after the disk operating system has booted. Any damage caused by corrupted system files and data may already be done. If a virus has already attached itself to one of the operating system files, once this file has been loaded (during boot), the virus is in control.

Other approaches to virus protection require booting the system from a known floppy disk and checking the hard disk before allowing the use of files stored on the hard disk.

As other approaches to virus protection are resident on disk, they themselves can be corrupted.

Even if you have protected your system from unauthorized access and viruses, once your PC is turned on and validly accessed, it is again vulnerable. Most people turn their PCs on in the morning and leave them on all day. Lunch, an out of the office appointment, long meetings, or Just going down the hall are all opportunities for unauthorized access to data. A quick erase or a quick copy to a diskette may leave no signs of activity. However, it is impractical to exit your program, save your data, and turn your PC off every time you leave your desk for a few moments.

A PC screen can also inadvertently expose sensitive data such as payroll, financial, or personnel records to anyone. Information left on the screen while at lunch or a meeting, or obtainable through just a few keystrokes, is all that may be required to steal or destroy a file. In today's aggressive business environment, a company's competitive edge is relative to its customer files and information, or proprietary information such as product development, marketing and sales plans, and product price and costs lists.

Accordingly, it remains highly desirable to provide the ability to detect the presence of viruses in a manner which will allow the operation of the computer to be halted, for example by failing to complete the boot operation, on a regular basis. Furthermore, computer security remains of vital importance.

SUMMARY OF THE INVENTION

In accordance with the teachings of this invention, various techniques are employed in order to provide security to a computer system. Certain embodiments are particularly well suited to network environments, and in particular to network environments including one or more PCs. In one embodiment of this invention, tests are performed prior to or during the boot operation in order to determine whether selected programs and/or data files have been corrupted. This may indicate the presence of a virus. In one embodiment, files which will be used during the boot operation are checked for modification prior to allowing those files to be used for system boot. If a potential error is detected, system boot is halted, allowing the user to boot the system from a known, uncorrupted set of files, for example as contained on a floppy diskette. In an alternative embodiment of this invention, additional program and/or data files (which are not used during the boot operation) are checked for corruption either prior to the boot operation or immediately following the boot operation.

In another embodiment of this invention, a unique access diskette is used as a hardware key to allow a user to demonstrate his authorization to gain access to the computer. The unique hardware key is provided by uniquely formatting a standard floppy diskette in such a manner that it contains information indicating the user's authorization to access the system. In one embodiment, this unique formatting is such that the information contained on the access diskette cannot be easily read using the standard diskette reading technique which is used for reading normal data contained on a normal data diskette, or using the typical software diskette "tool kits" available in the prior art. In accordance with one embodiment of this invention such an access diskette is used in conjunction with user supplied information, such as user I.D., password, and the like, in order to provide two levels of security for the system. If desired, a first level of security can be implemented for users requiring low level access, and a second level of security (including an access diskette) is implemented for users requiring higher level of access, such as system administrators, supervisors, and the like. In accordance with this invention, information contained on the access diskette is provided in a pseudo random fashion, for example, either using a pseudo random number generator or by generating access diskette information in response to information stored in all or parts of the system memory, mass storage device, or the like at the time an access diskette is created. Since information contained in memory, disks, etc., change relatively rapidly, this technique provides pseudo random information for use in creating an access diskette. This information is also stored within the computer for comparison purposes when a prospective user seeks to access the system utilizing a diskette key. In one embodiment of this invention, information stored on the diskette key is also provided by a identification number contained within the computer itself or a portion of the computer hardware dedicated to performing security functions. In this embodiment, the information contained on a diskette key also includes information which, in essence, pertains to the "serial number" of a given computer, thereby preventing this access diskette from being used in another computer for creation of an access diskette for use with that other computer.

In another embodiment of this invention, a method and structure is taught which allows a supervisor or security officer to control security information stored locally in individual PCs remotely, for example via a host computer on the network to which the PC is connected. In this manner, a supervisor or security officer can easily control and update security information pertaining not only to access to the host system, but information which contains user access to an individual stand-alone PC.

In another embodiment of this invention, security from unauthorized access is provided once a valid user has legitimately accessed a computer. In this embodiment, in response to the user pressing a predefined hot key or a predetermined period of time during which the user has not provided input to the computer, selected portions of the computer are disabled, thereby preventing unauthorized access. For example, in response to an elapsed period of time during which the user has not made data or command entry to the computer (for example when the valid user has left the room without logging off) the screen, keyboard, printer, data transmission means, or the like, or various combinations, are disabled, thereby preventing an intruder from observing confidential information during the time the valid user has left the computer. Once disabled, execution of programs currently running or queued to run continues, thereby maintaining computer productivity. Upon entry of appropriate access information by the valid user, the disabled features of the computer are once again enabled allowing full access by the valid user. If desired, this user authorization information to reenable disabled features may comprise a password, a user I.D., a hardware key, such as an access diskette, or the like, or various combinations thereof.

In another embodiment of this invention, access to the computer is made more difficult in response to invalid access attempts. For example, with an increasing number of invalid access attempts, audible and/or visual signals are emanated from the computer with increasing duration, increasing intensity varying pitch, or the like, in order to alert others in the general vicinity that inappropriate activity is occurring on the computer. In one embodiment, once a threshold number of invalid access attempts is reached, the computer is locked up, requiring reboot, thereby increasing the difficulty of a would be intruder to gain access to the computer. In one embodiment, once the threshold value is reached, it is reset to a lower value, thereby requiring the system to be rebooted more frequently in response to a lower number of invalid logon attempts.

These and other features of the present invention will be described by way of the following examples taken in conjunction with the figures.

DETAILED DESCRIPTION

While certain specific embodiments described herein refer to providing security to PC systems, and PC systems connected in a network, perhaps with a host computer such as a mainframe, it is to be understood that the teachings of this invention are equally applicable to a wide range of computer applications, including computer networks which do not utilize PCs.

Furthermore, a number of specific embodiments are described below. It will be appreciated by those of ordinary skill in the art in light of the teachings of this invention that various combinations of these embodiments may be used in any particular system, or may be provided in a system for selection by a user, thereby providing a large number of permutations of combinations of the various features of this invention.

I. Firmware Virus Checker

Figure 1:
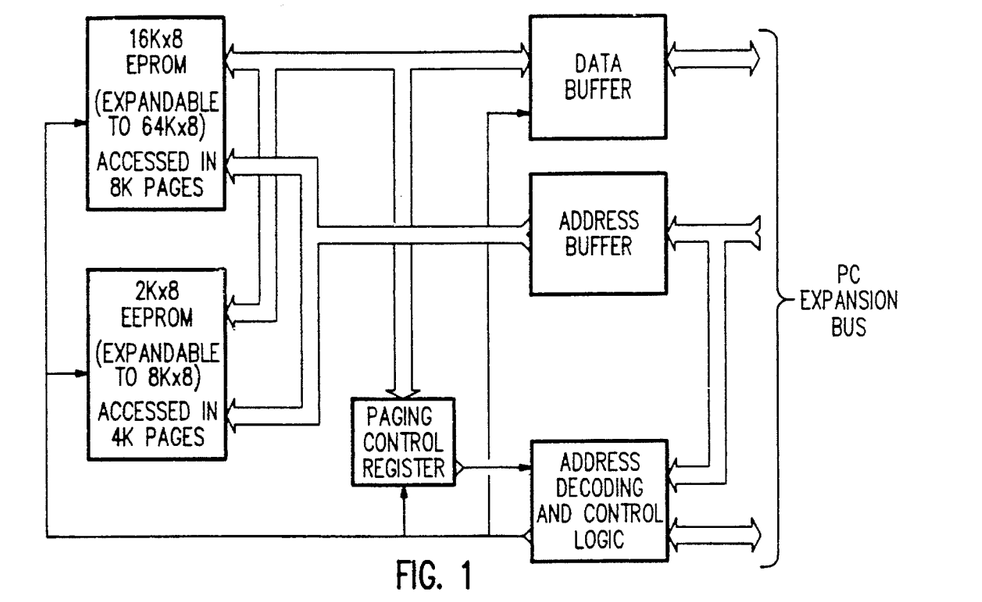
FIG. 1 is a block diagram depicting one embodiment of security hardware constructed in accordance with the teachings of this invention.

FIG. 1 depicts one embodiment of a security hardware subsystem of this invention which implements an 8KB aged ROM window. This embodiment allows a 16KB EPROM (which contains the virus checker algorithm and, if desired, other various security related firmware) and a 2KB EEPROM (a non-volatile memory device which is used to store security configuration data) to be accessed by the computer from within a single 8KB window. This embodiment minimizes the requirements for system memory space, while also providing an indirect (hidden) access mechanism for the EEPROM device (i.e. protecting secure data).

The following description refers to a computer system including a mass storage device, such as a hard disk as found in a typical PC. It is to be understood that the teachings of this invention apply equally well to systems including one or more hard disks, virtual disks, or hard disks partitioned as more than one disk. Furthermore, the teachings of this invention apply equally well to systems utilizing other types of storage media.

This invention is particularly well suited for use with desktop or laptop computers which are perhaps more susceptible to viruses than large systems which incorporate sophisticated security schemes. In accordance with the teachings of this invention, a firmware resident program is provided which accesses the file structure of the hard disk before the disk operating system is loaded, in order to verify the integrity of the data and program files on that disk which will be used during the disk operating system boot loading process. In one embodiment of this invention, the system areas checked in a typical IBM compatible PC is shown in Table 1.

TABLE 1

System CMOS SRAM
Disk Boot Areas (Hard Disk Master Boot Track and
the DOS Boot Sector)
DOS BIO hidden system file (IO SYS or IBMBIO.COM)
DOS OS hidden system file (MSDOS.SYS or IBMDOS.SYS)
DOS command processor file (COMMAND.COM)
AUTOEXEC.BAT
CONFIG.SYS In an alternative embodiment, the method of this invention verifies the integrity of all or a selected set of program and data files in addition to those programs and data files which are used during the disk operating system boot loading process. Since the program of this invention is contained within the computer itself, it eliminates the need to boot from a floppy disk in order to pre-check the hard disk. Furthermore, in one embodiment, the virus checking software is resident in firmware, such as a ROM, and thus occupies no disk space and eliminates the possibility of the virus checking software of this invention itself being corrupted by viruses.

The program of this invention is accessed by the system mother board during adapter board initialization (ROM scan) prior to loading the disk operating system. By residing in the system as firmware, this program is automatically executed upon power up, requiring no operator intervention during its execution. Although in one embodiment the virus checking firmware is executed using the security hardware subsystem shown in FIG. 1, any suitable boot ROM hardware architecture could be utilized in accordance with the teachings of this invention. The program of this invention implements algorithms necessary to read selected data and program files from the system hard disk, without requiring the services of the disk operating system.

Prior to running the virus checking program of this invention for the first time, the critical system data and program files (such as are required for system boot), as well as any other files previously specified by the user, are scanned and a proprietary signature (e.g. a CRC signature) is created for each file. These signatures are stored in non-volatile memory for later use during virus checking prior to system boot. As additional files are created or added to the hard disk and designated by the user as files which are to be virus checked prior to subsequent boot operations, additional signatures are created for each, and stored in the non-volatile memory for use during virus checking prior to subsequent system boots.

In one embodiment of this invention, a 32 bit CRC algorithm is used which in fact comprises a combination of two different 16 bit CRC algorithms. In this manner, the likelihood of a virus modifying a file and avoiding detection is significantly reduced as compared to the embodiment where a single CRC algorithm is used. Thus, for example, while a sophisticated virus may intentionally or by chance modify a file in such a way that the CRC for the file remains the same, such a virus will most likely not provide unchanged CRC signatures for more than one CRC algorithm.

Figure 2:
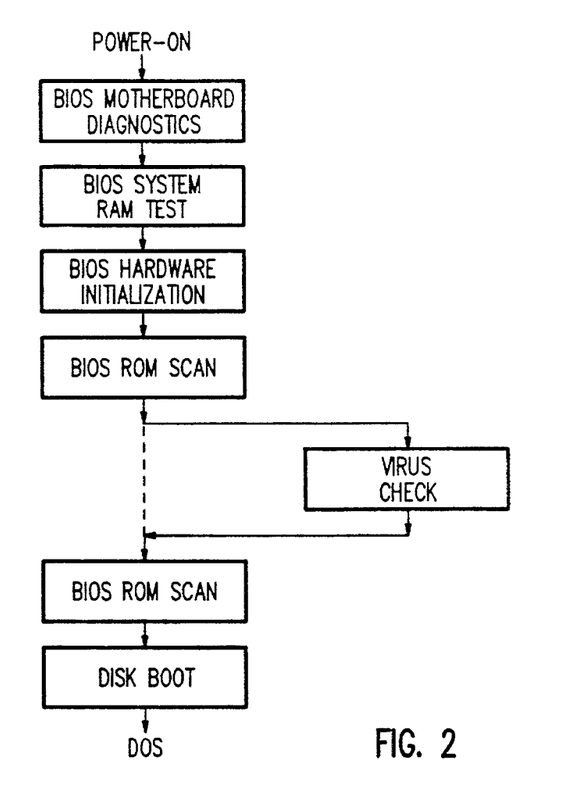
FIG. 2 is a flow chart depicting a typical PC system boot process which has been modified to include a virus/corrupted file checker in accordance with the teachings of this invention.

FIG. 2 is a flow chart depicting a typical PC system boot process which has been modified to include the virus checking algorithm of this invention. As shown in FIG. 2, upon power up, BIOS motherboard diagnostics are performed, in a well known manner. Following this, the BIOS system RAM test is performed and the BIOS hardware initialization step performed. Then the BIOS ROM scan takes place. All of these steps are well known in the prior art and can be performed in any desired fashion. Of interest, at any desired point during BIOS ROM scan, the firmware virus/corrupted file checking algorithm of this invention is performed, and if any potential problems are detected, a warning is given to the user and system boot is halted in order to allow the user to take appropriate action. Such appropriate action in the event of the detection of a potential problem might be booting the system from a floppy diskette which is known to be free of viruses. As shown in FIG. 2, following successful completion of the firmware virus check in accordance with the teachings of this invention, BIOS ROM scan continues following which the system is booted from the hard disk in the normal manner.

Figure 3:
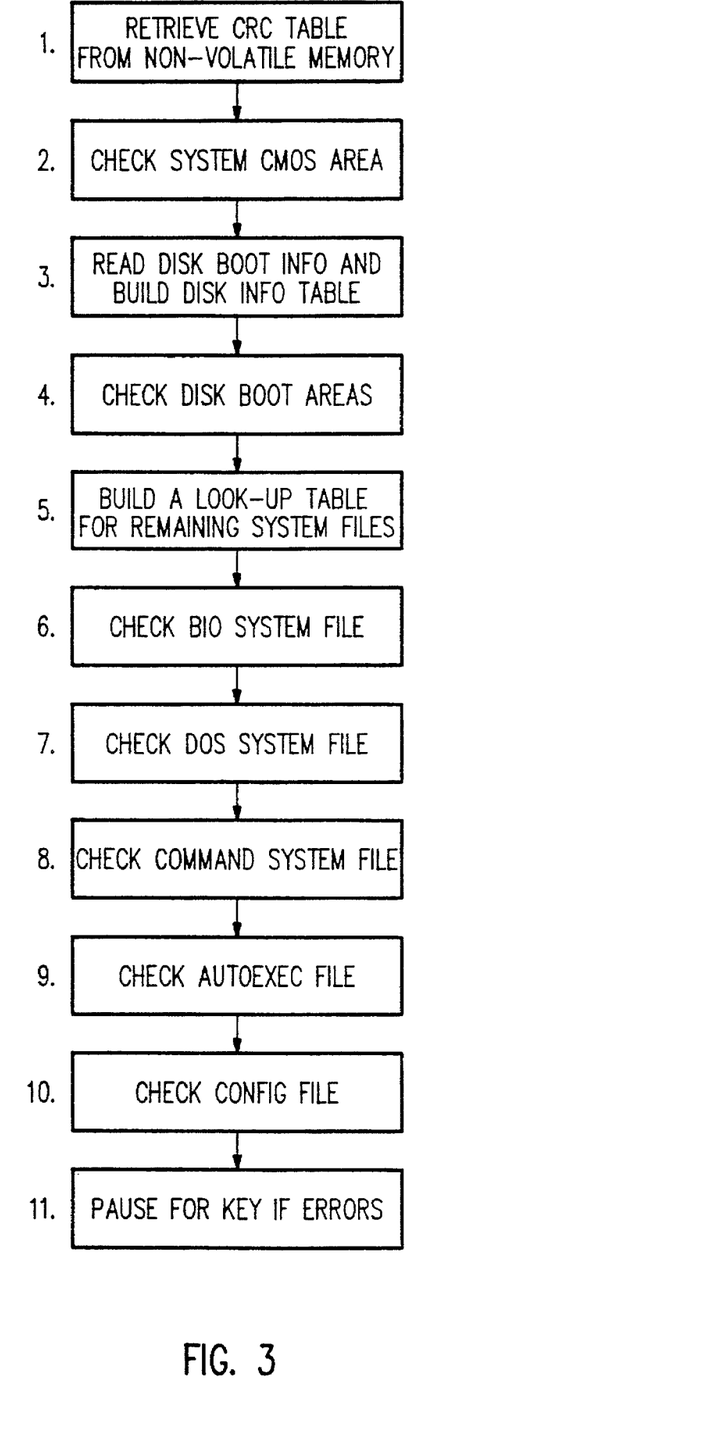
FIG. 3 is a flow chart depicting in greater detail one embodiment of a virus/corrupted file checker as shown in FIG. 2.

Referring to FIG. 3, a more detailed explanation of the operation of one embodiment of the firmware virus/corrupted file checker of this invention is described.

1. The table of previously created CRC signature is retrieved from non-volatile memory. The system CMOS area is scanned and a CRC is
2. calculated. The new CRC is compared with the old CRC and differences are posted for example, to a data log, the screen, or a printer. Any errors at this point abort further testing.
3. Since DOS has not been booted, DOS has not yet created tables of information regarding, for example, file pointers describing locations of system files on the hard disk. Thus, the virus/corrupted file checker of this invention reads the disk boot areas from disk into a buffer. Disk structure information is extracted from the boot information and from various system BIOS services, and a disk information table is built in the computers RAM in order to allow the virus/corrupted file checker of this invention to access, for example, system files contained on the disk.
4. A CRC is calculated for the disk boot information currently in the buffer. The new CRC is compared with the old CRC and differences are posted. Any errors detected at this point aborts further testing.
5. The root directory of the disk is scanned and a look-up-table is built which contains starting file allocation table (FAT) offsets and sizes for the remaining system files to be checked.
6. The BIO system file is read into a contiguous buffer and a CRC is calculated. The new CRC is compared with the old CRC and differences are posted.
7. The DOS system file is read into a contiguous buffer and a CRC is calculated. The new CRC is compared with the old CRC and differences are posted.
8. The COMMAND system file is read into a contiguous buffer and a CRC is calculated. The new CRC is compared with the old CRC and differences are posted.
9. The AUTOEXEC file is read into a contiguous buffer and a CRC is calculated. The new CRC is compared with the old CRC and differences are posted.
10. The CONFIG file is read into a contiguous buffer and a CRC is calculated. The new CRC is compared with the old CRC and differences are posted.
11. If any errors are detected, system boot is halted in order to allow the user the opportunity to boot from a recovery diskette or alternate DOS diskette, if desired.

Once the algorithm of this invention has been executed, control is returned to the system BIOS to allow continuation to the normal DOS boot process, as shown in FIG. 2.

When the program of this invention is executed prior to disk operating system boot, each of the system data areas and files are scanned, and signatures calculated. These new signatures are then compared with the values stored in non-volatile memory. Any differences are reported as an integrity failure with specific data or program files. If a failure is detected, the user is given the option to boot from a recovery diskette, thereby allowing the system to be booted from a disk containing a disk operating system known to be uninfected by a virus. Thus, the computer becomes usable and the user is able to investigate the potential problems on the hard disk, and allows the replacement of potentially infected or corrupted program and data files. By restoring corrupted files prior to their use during boot or subsequent execution of applications software, possible system disaster can be averted by preventing the spread of a virus throughout the system.

This teachings of this invention are suitable for use in any type of device which loads critical operating system information from hard or soft disk media, where potential contamination by a virus could have dangerous impact, for example: process control, power plants, launch control, lottery, communications center, data routing systems, electronic funds transfer, and the like.

In one embodiment, specific program or data files which have been previously specified by a user are automatically checked after the system has booted. If any of the selected files have been modified, indicating a potential problem, including the presence of a virus, the user will be notified of the change.

II. Access Diskette

In accordance with the teachings of this invention, a diskette is uniquely formatted using a method which is non-standard for the resident disk operating system. This diskette is then capable of being read and verified by resident security software so that it may be used as a hardware key to access the system. Of importance, in accordance with teachings of this invention, a diskette key is provided which utilizes standard floppy disks, rather than special hardware or key devices as known in the prior art. However, the standard floppy disk which is formatted according to the teachings of this invention in order to serve as an access key cannot be read or copied by standard operating systems utilities or after-market disk utility programs.

In one embodiment of this invention, the algorithm used to create access diskettes is based on two randomly generated signatures (numeric values) such that all access diskettes (with the exception of a backup access diskette, if desired) are unique in two ways:

1. Each access diskette is uniquely formatted; and
2. Each access diskette contains different "key" information.

In one embodiment, the signature values which are used to create access diskettes are generated such that they are unique for a given PC, and unique from one creation time to another. If desired, a mechanism is also provided to manually supply the signature values during access diskette creation.

The access diskette is read and verified by resident software (or firmware) which requires a valid access diskette before access to the system is allowed. The access diskette may be used as a "stand-alone" key to the system or may be used in conjunction with a password to "double-lock" the system.

In accordance with one embodiment of this invention, a password is used in conjunction with the access diskette in order to control access to the computer. In an alternative embodiment of this invention, certain passwords (e.g. a User password) are sufficient to obtain access the computer without the use of the hardware access diskette. The access diskette must be used, however, to obtain a higher level of access, for example that level which is available when utilizing a Supervisor password.

An access diskette of one embodiment of this invention comprises three parts:

(1) Identification information indicating this is an access diskette. This identification information is stored in a portion of the diskette which will be referred to as the identification sector or identification track.

(2) An access signature, which is preferably unique for a given system. The access signature is stored in a portion of the access diskette called the key sector or key track.

(3) The remainder of the diskette.

The identification information indicating this is an access diskette need not be used for the purpose of controlling access to a specific PC and thus can be the same for each system. In one embodiment, a copyright notice is conveniently used for this purpose.

The access signature is comprised of two portions, a value specifying the location on the access diskette where the signature is located, and a signature which is uniquely assigned to a given access diskette.

In one embodiment, the location on the access diskette where the access signature is located is defined by a 32-bit key value which is mapped as shown in Table 2. Naturally, it will be readily appreciated in light of the teachings of this invention that any desired number of bits can be used to specify the location of the access signature on the access diskette, and a number of arrangements for bit mapping of this information is possible within the spirit of this invention.

TABLE 2

| HIGH WORD | | | LOW WORD | | |
|---|---|---|---|---|---|
| not used | 5 bit track pos. | 8 bit sector offset | H E A D | 7 bit track # | 8 bit Sector # |
| bits 31–29 | bits 28–24 | bits 23–16 | bit 15 | bits 14–08 | bits 07–00 |

The key track contains the sector ID number specified in the location key in the position (i.e., the 4-bit track position field) specified by the location key.

For example, if the specified sector ID is 123 and the position code is 4, each formatted track contains the sector ID in the order shown in Table 3.

TABLE 3

| Track Pos | 0 | 1 | 2 | 3 | 4 | 5 | 6 | 7 | 8 |
|---|---|---|---|---|---|---|---|---|---|
| Sector ID | 119 | 120 | 121 | 122 | 123 | 124 | 125 | 126 | 127 |

After the key track is formatted, the signature is written to the key sector (sector ID 123 in the example of Table 3) at the offset specified in the location key value (i.e. the 8-bit sector offset field). The key sector can also contain a usage count immediately following the signature bytes, as well as any other desired data.

Then, the first sector ID (sector 119 in the example of Table 2) is reformatted as the sector number containing information indicating that this is an access diskette.

The identification sector is then prepared and written to the diskette in the reformatted sector. In one embodiment, the identification sector includes the 32-bit key value. In one embodiment, the key value is derived from the board identification number (BIN) of the security hardware of this invention, in order to prevent a single access diskette from being valid in more than one PC. Without a unique signature in the identification sector, it is possible for a single diskette to be used to create a valid access diskette in more than one PC, because the key track/sector/head varies from one system to the next.

The verification process reads the two significant sectors (the key sector and the identification sector) and ensures that the system specific information and the identification information are valid. If an error occurs reading the access diskette during verification, it is assumed to indicate an invalid access diskette and access is refused.

In one embodiment of this invention, the access signature is a 32-bit value which is unique to a particular access diskette. If desired, however, a duplicate access diskette is created at the same time an access diskette is created.

In one embodiment, the access signature is created as the current (at the time the access diskette is created) CRC of a portion of the system data. For example, a CRC of the file allocation table (FAT) may be created, or of a specified portion of the hard disk, or the RAM, or a specified portion thereof. Alternatively, additional hardware memory (such as the non-volatile memory used for storing security information, such as is described above with regard to virus checking) is used to create the access signature. Using the current CRC as a location code insures that the creation of each key disk is unique. A lookup table is provided such that each authorized key disk value is stored and checked upon insertion of a key disk for login purposes. A system administrator is able to delete undesired previous key disk access signatures as they become no longer required.

In one embodiment, the remainder of the access diskette, i.e., that portion of the access diskette which is not used to store the identification information notice or the access signature, is ignored, leaving a large number of unused tracks. In an alternative embodiment, the remainder of the access diskette is filled. In this embodiment, the unused tracks are preferably filled such that the diskette contains a large number of unused tracks which are filled with data which appear substantially similar to the data stored in the tracks used to store the identification information notice and access signature. For example, each unused sector is written to store a pattern similar to that stored in the key sector which stores the access signature except, of course, that the access signature is not contained within the key sector. This makes it very difficult for an unauthorized person to read the access diskette and determine the access signature.

IV. Local Information Modified or Controlled by Remote Host

In accordance with one embodiment of this invention, a unique process is provided by which a remote host computer system may access a local desktop or personal computer and modify its information. This information may be data, whereby the host computer can modify local computer data, for example as the master information stored in the host changes, or in order to encrypt or decrypt information which is stored in the local computer. Alternatively, or in addition thereto, this information which is capable of being modified or controlled by the remote host computer can be local security information, thereby allowing the host to remotely control access to the PC. This allows system administrators to control access to individual PCs remotely, via the host computer system. The teachings of this invention may be used to remotely change information stored in the PC which determines whether a user may gain access to that PC, such as authorized user ID and password information. It is also possible for the host to update information stored within the PC which serves as a table of information which is authorized to be accessed by one or more users. System administrators may also use the remote system of this invention to remotely access use information stored within the PC, such as date and time information associated with each successful and/or unsuccessful attempt to log into the PC.

Figure 4:
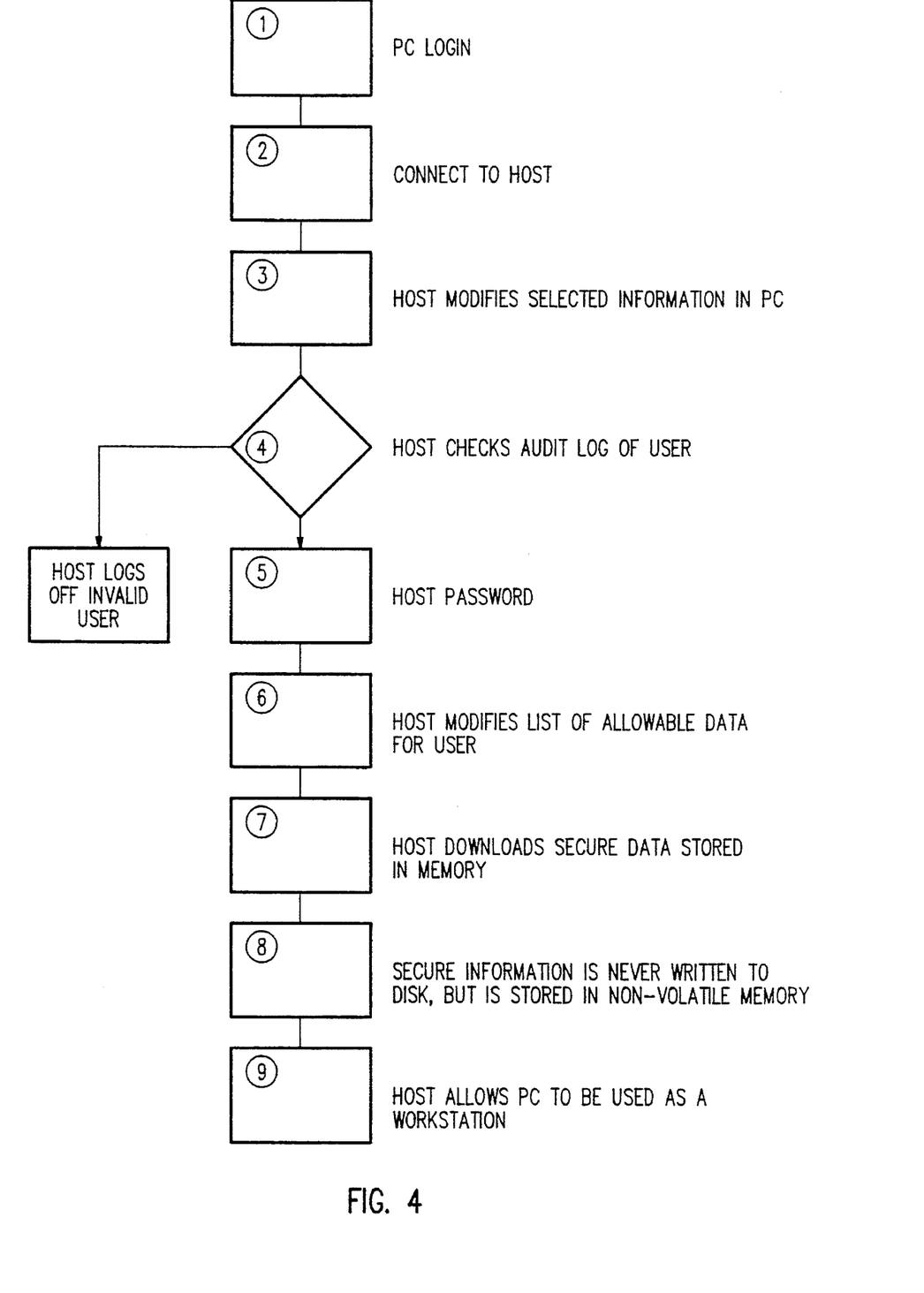
FIG. 4 is a flow chart depicting one embodiment of an algorithm in accordance with the teachings of this invention which allows security information contained in a local computer to be modified from a remote host computer.

FIG. 4 is a flow chart depicting one embodiment of this invention for use in a network including a host computer and a PC having local security information which is capable of being modified from the remote host. As shown in the flow chart of FIG. 4, a first step in this embodiment is that the PC logs into the host system, for example in any one of a number of well known ways, following which the PC is connected to the host computer as shown in Step 2. In Step 3, the host modifies or updates selected information in the PC, such as the user ID and/or password information of valid users. In Step 4, the host checks the audit log of the individual user of the PC system in order to determine user audit log information. In the event that the audit log indicates unauthorized activities, the host computer causes user access to be revoked.

Conversely, if the check of the audit log of the individual PC user determines no reason to forbid access to the host computer, operation branches to box 5 in which the host computer requests and receives from the PC a password from the PC user. In Step 6, the host computer modifies a list of allowable data files which may be accessed by one or more users. Secure data associated with the user, as shown in Step 7, is downloaded from the host to the PC. This secure information is appropriately stored within the PC for later use by the PC.

In one embodiment, as shown in Step 8, this secure data is not stored on the disk of the PC where it might be undesirably retrieved by a potential intruder. This allows greater control of secure information since the data stored in memory is erased when the PC is turned off. In this embodiment (for example as shown in FIG. 1), such security information is stored in hardware contained within the PC, for example in nonvolatile memory (such as an EEPROM) located in an area of the PC dedicated to security functions, such as a security card installed in one of the expansion slots.

As shown in Step 9, the host computer then allows the PC to be used as a work station with access to the host computer.

VI. Active System Security

In accordance with one embodiment of this invention, a unique system is taught which allows an active computer system to be secured from use without disabling the processing capability of the system.

In this embodiment, computer applications are protected from unauthorized use via screen blanking and/or keyboard lock with password unlock. In one embodiment, the user may blank the screen at will via a previously defined hot key, and/or the screen will blank automatically after a user-specified period of inactivity (automatic timeout). In addition to screen blanking, the keyboard is locked and disabled from normal use until the proper password is entered via the keyboard. This password may or may not be the same as the password required for initial logon to the system. This automatically protects the PC from access while the user is away for a specified period of time.

Although the screen is blanked and the keyboard locked from normal use, any processing which is currently underway on the PC continues, thereby maintaining productivity. In addition to the opportunity to cause screen blanking and keyboard lock, other computer functions can be disabled as well, as desired. For example, if a lengthy and confidential report is printing or will be printed following lengthy processing, it may be desirable to disable printing when the user leaves the room, as indicated by his pressing a predefined hot key his or failing to make keyboard entry for a predetermined period of time. Other input/output functions such as data communication (either transmission, reception, or both) can be disabled in a similar manner.

In an alternative embodiment, upon an appropriate timeout or in response to the user pressing a previously defined hot key, the screen is blanked and a prompt for entry of the user password is provided on the screen. In this embodiment, the data contained on the screen disappears so as not to be visible to unintended eyes, yet a prompt appears indicating to the user that all is well with the computer and that upon entry of a correct password, the user will regain access.

In another embodiment, attempts to gain access once the screen has blanked are recorded, alternatively, only unsuccessful attempts to access are recorded. Information pertaining to these attempts, such as the time at which they occur, or their number, or even the unsuccessful passwords, are made available to the authorized user when he regains access to the system by entering the correct password.

VII. Intelligent Access Control

In accordance with one embodiment of this invention, an access control program or software package dynamically alters its defense tactics, making it progressively more difficult to illegally access the system. For example, if it is determined that excessive attempts are being made to enter a password, a series of tones are sounded to alert others in the vicinity, thus discouraging anyone illegally trying to access the system by trial and error.

In one embodiment of this invention, all logon accesses to the system are tracked by maintaining an access log or audit trail. The access log indicates the date and time of both valid logons and invalid logon attempts. The user may configure the system such that, after each valid logon, the access log table and/or a message is provided (such as a written message or a beep tone) indicating if any invalid attempts have been made to logon to the system.

Figure 5:
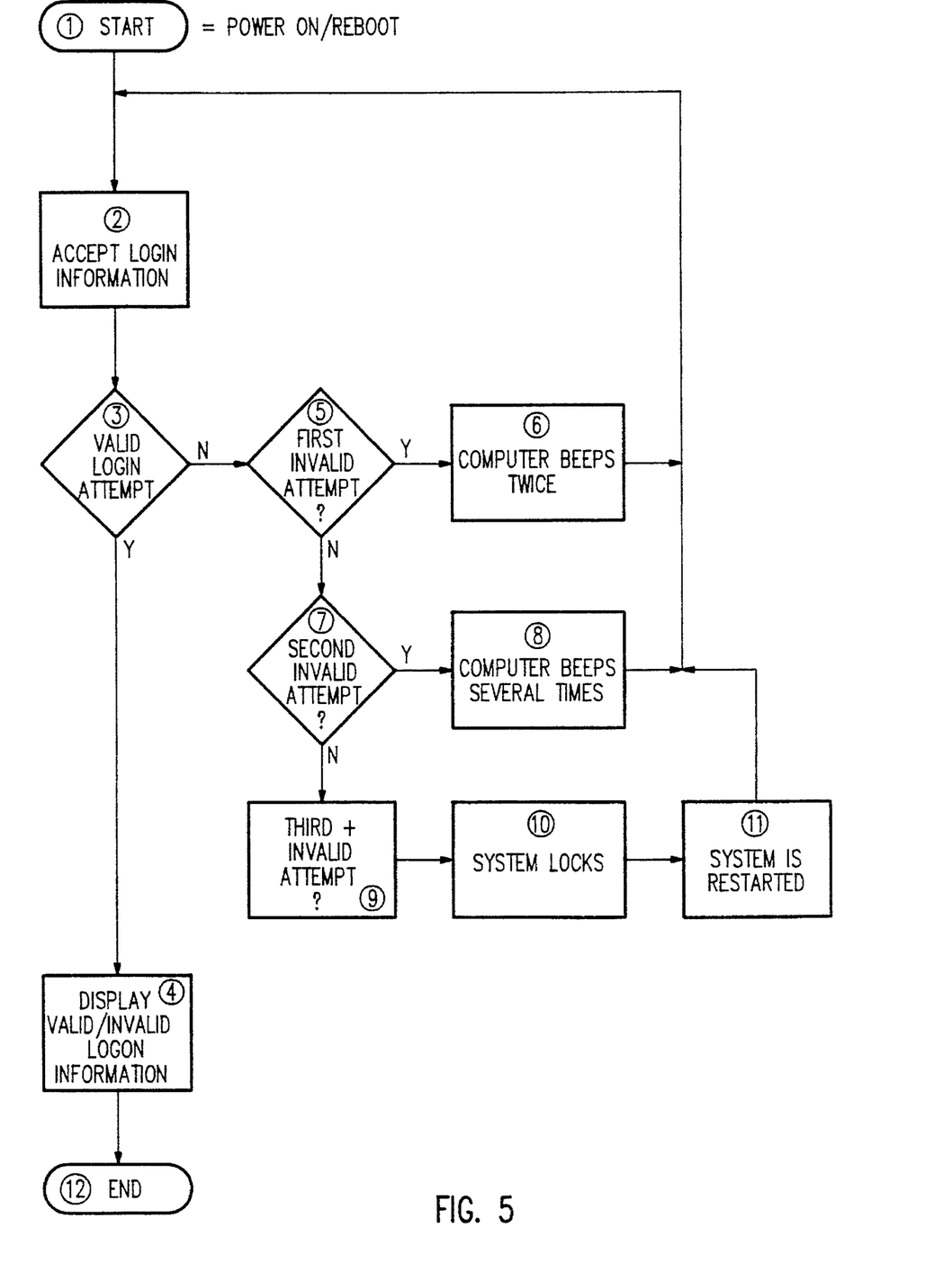
FIG. 5 is a flow chart depicting one embodiment of an algorithm of this invention which provides for intelligent log on to a computer system.

FIG. 5 is a flow chart depicting the operation of one embodiment of a system constructed in accordance with the teachings of this invention. Box 1 is the starting point, or entry into this embodiment of a routine operating in accordance with the teachings of this invention. This occurs, for example, upon power up of the computer, upon reboot, or when access to the computer is desired by a user. Not shown in this flow chart is the step of configuring the threshold level. This occurs only once a user having valid authority has successfully logged onto the system and entered a configuration step, whereby one or more threshold values are set and stored for use during future logon attempts.

Box 2 requests and accepts from the user login information, such as user I.D. and password. Decision Step 3 determines whether the login attempt is valid, i.e. whether the login information is correct according to authorized login information stored in the computer. If the correct login information is received, control passes to Step 4 which, if desired, displays valid and/or invalid login information. For example, this step indicates to the authorized user who has just gained access, the number of, or specific information related to, authorized and/or unauthorized login attempts. If desired, this information can be limited to login attempts which occurred since this user's last authorized login, or from a specified date or time. Alternatively, various techniques can be used to otherwise limit the amount of login information displayed, for example when a specified number of failed login attempts occur within a given short period of time, which is indicative of an unauthorized user attempting to gain access to the system by trial and error. This login audit log information is, in one embodiment, also available for remote polling by a host system, thereby allowing a system administrator to become alerted to attempted breaches of security at the PC level.

Conversely, if in Step 3 an invalid login attempt is detected, control passes to decision Step 5 which determines if this is the first invalid login attempt during a specified period of time, for example since the last valid login, or during a particular time period. If it is determined that this is the fist invalid login attempt according to the criteria used by decision Step 5, control passes to Step 6 and the computer beeps twice as an indication of an invalid login attempt. This audible signal is not too distracting but may alert others in the area to pay particular attention if additional error signals are heard. Control is then passed to block 2, allowing the user to attempt to login again. Conversely, if Step 5 determines that an invalid login attempt was not the first, control is passed to decision Step 7 where it is determined if the invalid login attempt was the second invalid login attempt. If so, control passes to Step 8, wherein the computer beeps several times prior to passing control back to Block 2. This will allow others in the vicinity to notice that something is awry and perhaps call security or take their own steps in order to determine the identity of this would-be intruder.

Conversely, if decision Step 7 determines that the invalid login attempt was not the second invalid login attempt, control is passed to block 9 which initiates action commensurate with the fact that three or more invalid login attempts have been detected. Control is passed to block 10 wherein the computer system is locked, for example by halting the system microprocessor, requiring the system to be rebooted (either hot or cold, as specified by information to which block 10 responds which information has been previously supplied by a legitimate user). This requires that the computer be rebooted, as shown in Step 11, prior to returning control to Step 2, which again allows a user to attempt to obtain access. Upon reboot, the threshold is set to one, thereby allowing only one password access failure before locking up the system and thereby requiring a reboot. Thus, after the initial threshold value (in this example, 3) of unsuccessful login attempts is reached, the system is locked up and must be rebooted, after which only one invalid login attempt is allowed before requiring the system to be rebooted. In one embodiment of this invention, the programmable threshold value is reset to its normal value (in this embodiment, 3) in response to to a valid login.

By requiring the system to be rebooted after a predetermined number of failed login attempts, considerable difficulty is encountered by the unauthorized user who is attempting to illegally gain access to the system. For example, rather than being able to rapidly enter a large number of potentially correct passwords on a hit or miss basis, the process is considerably slowed by the need to reboot the computer after three failed login attempts. In addition, audible signals from the computer indicating failed attempts will alert others in the physical proximity of the computer that something inappropriate is happening.

Naturally, other embodiments of this invention will become readily apparent to those of ordinary skill in the art in light of the teachings of this invention, for example, additional decision steps such as Steps 5 and 7 may be employed so that any number of security threshold levels may be provided. For example, in one alternative embodiment, no audible signal is provided in response to a first invalid login attempt, as often occurs due to a simple typographical error by a user during his login attempt. In response to a second invalid attempt, the computer beeps twice; in response to third, fourth, and fifth invalid attempts, the computer beeps five times; and in response to the sixth invalid attempt the computer locks up, requiring reboot. This as well as numerous other variations are all within the scope of this invention.

Other alternative embodiments include not merely increasing the number of audible tones in response to an increasing number of failed logon attempts, but varying their intensity, pitch, or the like. For example, in response to an additional one or two failed logon attempts, a simple beep may be sounded while in response to a third failed logon attempt, a lengthy and loud wailing sound might be produced. Furthermore, in addition to audible signals, unique visual patterns may be flashed upon the screen, perhaps frightening the intruder away, and possibly alerting others in the area that something inappropriate is occurring on the computer.

VIII. Non-Volatile Security Configuration Data Storage

A mechanism is provided for the storage of security configuration and audit data in a non-volatile storage device, such that the data can be error checked and corrected and protected from tampering.

In this embodiment, security data is stored in non-volatile memory (e.g. hardware incorporated in the security hardware shown in FIG. 1) which eliminates the need to store on an easily accessible hard disk.

In this embodiment, data is structured in redundant tables whose contents are monitored via both checksum and CRC algorithms. By containing embedded checksums and CRC, the data can be readily checked for corruption. The redundant table structure provides a mechanism for automatic data recovery (correction) should one of the tables become corrupted.

Error checking and correction are provided through firmware access routines. The checking and correction processes are transparent to the application.

The invention now being fully described, it will be apparent to one of ordinary skill in the art that many changes and modifications can be made thereto without departing from the spirit or scope of the appended claims.

What is claimed is:

1. A method for controlling access to computer system during a boot operation comprising the steps of:

receiving user authorization information from a prospective user;

determining if said user authorization information is valid;

if said user authorization information is valid, allowing said prospective user to have access to said computer system by booting said computer system; and if said user authorization information is invalid, increasing the difficulty of gaining access to said computer system by reducing threshold number to a lower threshold number following a number of invalid user authorization attempts which equals or exceeds said threshold number.

2. A method as in claim 1 wherein said step of determining if said user authorization is valid further comprising the step of remote polling by a remote host computer.

3. A method as in claim 1 which further comprises the step of allowing the user to disable said computer during usage, requiring receipt of user information for further access to said computer.

4. A method as in claim 6 wherein said user authorization information is a password which differs from a password used to gain access to said computer system prior to said inactivation.

5. A method as in claim 1 wherein upon said prospective user gaining access to said computer, information pertaining to the number of unsuccessful attempts to access said computer are displayed to the user.

6. A method as in claim 1 wherein said computer system is automatically inactivated after a predetermined period of inactivity.

7. A method as in claim 6 wherein during said period of inactivation, said computer continues processing activity.

8. A method as in claim 6 wherein during said period of inactivation input/output functions resulting from said computer processing are disabled.

* * * * *